(12) United States Patent
Kai et al.

(10) Patent No.: US 11,513,316 B2
(45) Date of Patent: Nov. 29, 2022

(54) SINGLE FOCUS IMAGE PICKUP OPTICAL SYSTEM, AND IMAGE PICKUP DEVICE AND CAMERA SYSTEM USING SINGLE FOCUS IMAGE PICKUP OPTICAL SYSTEM

(71) Applicant: Panasonic Intellectual Property Management Co., Ltd., Osaka (JP)

(72) Inventors: Hideki Kai, Yamagata (JP); Yasunori Touchi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 283 days.

(21) Appl. No.: 16/618,490

(22) PCT Filed: Jul. 2, 2018

(86) PCT No.: PCT/JP2018/024994
§ 371 (c)(1),
(2) Date: Dec. 2, 2019

(87) PCT Pub. No.: WO2019/009225
PCT Pub. Date: Jan. 10, 2019

(65) Prior Publication Data
US 2020/0341238 A1 Oct. 29, 2020

(30) Foreign Application Priority Data
Jul. 6, 2017 (JP) .............................. JP2017-132411

(51) Int. Cl.
*G02B 9/12* (2006.01)
*G02B 7/14* (2021.01)
*G03B 17/14* (2021.01)

(52) U.S. Cl.
CPC ................. *G02B 9/12* (2013.01); *G02B 7/14* (2013.01); *G03B 17/14* (2013.01)

(58) Field of Classification Search
CPC ............. G02B 9/12; G02B 7/14; G03B 17/14
(Continued)

(56) References Cited

U.S. PATENT DOCUMENTS

| 5,066,113 A | 11/1991 | Nakajima et al. |
| 2011/0273611 A1 | 11/2011 | Matsusaka et al. |

(Continued)

FOREIGN PATENT DOCUMENTS

| EP | 3015897 | 5/2016 |
| JP | 2012-181508 | 9/2012 |

(Continued)

OTHER PUBLICATIONS

The Extended European Search Report dated Jun. 19, 2020 for the related European Patent Application No. 18828645.4.
(Continued)

*Primary Examiner* — William Choi
(74) *Attorney, Agent, or Firm* — Wenderoth, Lind & Ponack, L.L.P.

(57) ABSTRACT

A fixed focal length imaging optical system includes a first lens group having positive power, a second lens group having positive power, and a third lens group having negative power in order from an object side toward an image side. Upon focusing, the second lens group moves along an optical axis, and the first lens group and the third lens group do not move. The present disclosure provides the fixed focal length imaging optical system capable of favorably correcting various aberrations such as spherical aberration, astigmatism, and distortion, and an imaging device and a camera system each of which includes the fixed focal length imaging optical system.

11 Claims, 8 Drawing Sheets

(58) Field of Classification Search
USPC .................................. 359/716, 753, 791
See application file for complete search history.

(56) References Cited

U.S. PATENT DOCUMENTS

| | | |
|---|---|---|
| 2012/0314306 A1 | 12/2012 | Sunaga |
| 2013/0148006 A1 | 6/2013 | Toshinaga et al. |
| 2014/0139931 A1 | 5/2014 | Kubota |
| 2014/0184882 A1* | 7/2014 | Kuzuhara ............... G02B 9/12 |
| | | 348/345 |
| 2014/0334020 A1 | 11/2014 | Ono |
| 2014/0340563 A1 | 11/2014 | Yamada et al. |
| 2014/0347749 A1 | 11/2014 | Ono |
| 2015/0277087 A1 | 10/2015 | Karbe et al. |
| 2016/0170174 A1 | 6/2016 | Nishio et al. |

FOREIGN PATENT DOCUMENTS

| | | |
|---|---|---|
| JP | 2014-035458 A | 2/2014 |
| JP | 2014-102358 | 6/2014 |
| JP | 2015-043104 | 3/2015 |
| JP | 2015-191237 | 11/2015 |
| WO | 2013/118466 | 8/2013 |
| WO | 2013/118468 A1 | 8/2013 |

OTHER PUBLICATIONS

International Search Report of PCT application No. PCT/JP2018/024994 dated Oct. 2, 2018.
Communication pursuant to Article 94(3) EPC dated Jul. 15, 2022 in related European Patent Application No. 18828645.4, 4 pages.

* cited by examiner

SINGLE FOCUS IMAGE PICKUP OPTICAL SYSTEM, AND IMAGE PICKUP DEVICE AND CAMERA SYSTEM USING SINGLE FOCUS IMAGE PICKUP OPTICAL SYSTEM

CROSS-REFERENCE TO RELATED APPLICATIONS

This application is a U.S. national stage application of the PCT International Application No. PCT/JP2018/024994 filed on Jul. 2, 2018, which claims the benefit of foreign priority of Japanese patent application No. 2017-132411 filed on Jul. 6, 2017, the contents all of which are incorporated herein by reference.

TECHNICAL FIELD

The present disclosure relates to a fixed focal length imaging optical system capable of favorably correcting various aberrations, and an imaging device and a camera system each of which uses the fixed focal length imaging optical system.

BACKGROUND ART

PTL 1 discloses a wide-angle lens. The wide-angle lens includes a front group located at a fixed position relative to a shooting target and having positive or negative refractive power, a rear group located closer to an imaging surface and having positive refractive power, and an aperture diaphragm fixedly disposed between the front group and the rear group. The rear group is configured with a first partial rear group disposed closer to the aperture diaphragm and slidable along an optical axis line for focusing, and a second partial rear group located at a fixed position relative to the imaging surface.

PTL 2 discloses an imaging optical system. The imaging optical system is configured with first lens group G1 having positive refractive power, an aperture diaphragm, second lens group G2 having positive refractive power, and third lens group G3 having negative refractive power in order from an object side. Upon focusing from infinity to a near field, second lens group G2 moves toward an object along an optical axis in the imaging optical system. The second lens group is configured with only cemented lens DB2 and a positive lens having a biconvex shape in order from the object side. Cemented lens DB2 is configured by cementing a negative lens whose concave surface is directed toward the object and a positive lens whose convex surface is directed toward an image. The third lens group is configured with at least one positive lens and at least one negative lens so as to dispose the negative lens closest to the object and the positive lens closest to the image. Furthermore, the imaging optical system is configured to satisfy predetermined conditional expressions.

CITATION LIST

Patent Literature

PTL 1: Unexamined Japanese Patent Publication No. 2015-191237
PTL 2: Unexamined Japanese Patent Publication No. 2015-043104

SUMMARY OF THE INVENTION

A fixed focal length imaging optical system according to the present disclosure includes a first lens group having positive power, a second lens group having positive power, and a third lens group having negative power in order from an object side toward an image side. In the fixed focal length imaging optical system, upon focusing, the second lens group moves along an optical axis, and the first lens group and the third lens group do not move.

The present disclosure can provide a fixed focal length imaging optical system capable of favorably correcting various aberrations, and an imaging device and a camera system each of which uses the fixed focal length imaging optical system.

DESCRIPTION OF EMBODIMENTS

Hereinafter, exemplary embodiments will be described in detail with reference to the drawings. However, descriptions in more detail than necessary may be omitted. For example, a detailed description of a matter which is already well-known and a repeated description for a substantially identical configuration may be omitted. This is to avoid unnecessarily redundancy in the following description, and to facilitate understanding by those skilled in the art.

The applicant provides the attached drawings and the following description such that those skilled in the art can sufficiently understand the present disclosure, and therefore, they do not intend to restrict the subject matters of claims.

First to Third Exemplary Embodiments

Figure 1:
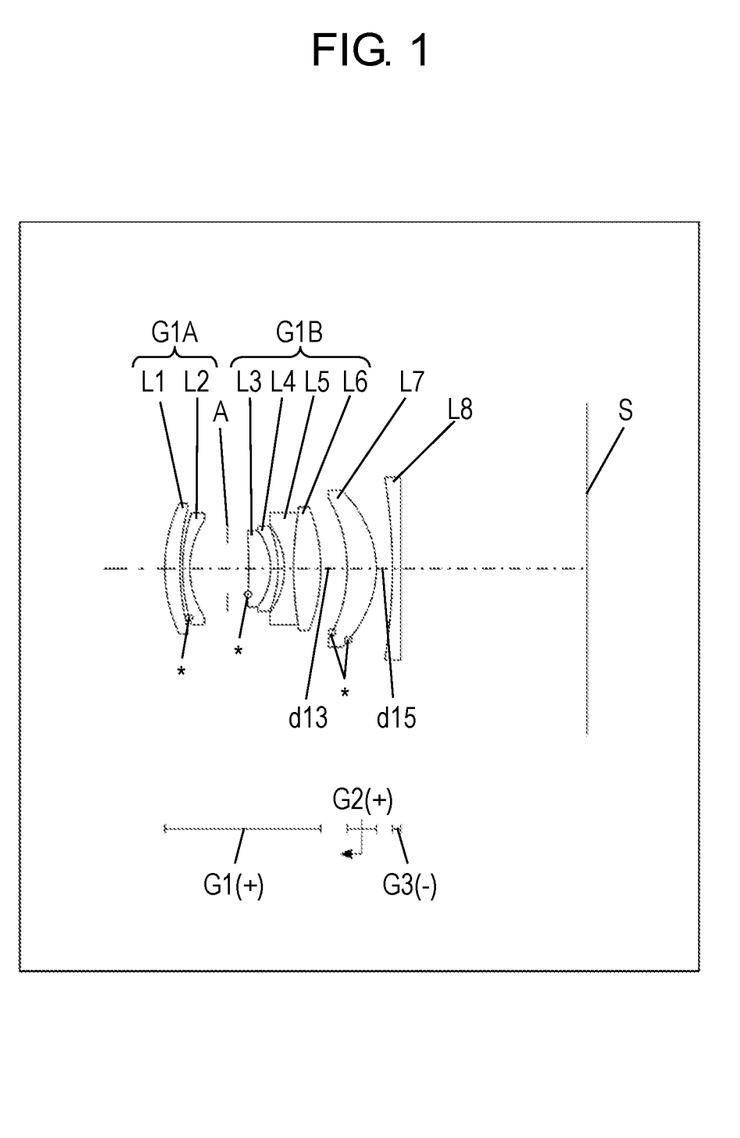
FIG. 1 is a lens arrangement diagram illustrating an infinity focusing state of a fixed focal length imaging optical system according to a first exemplary embodiment.
Figure 3:
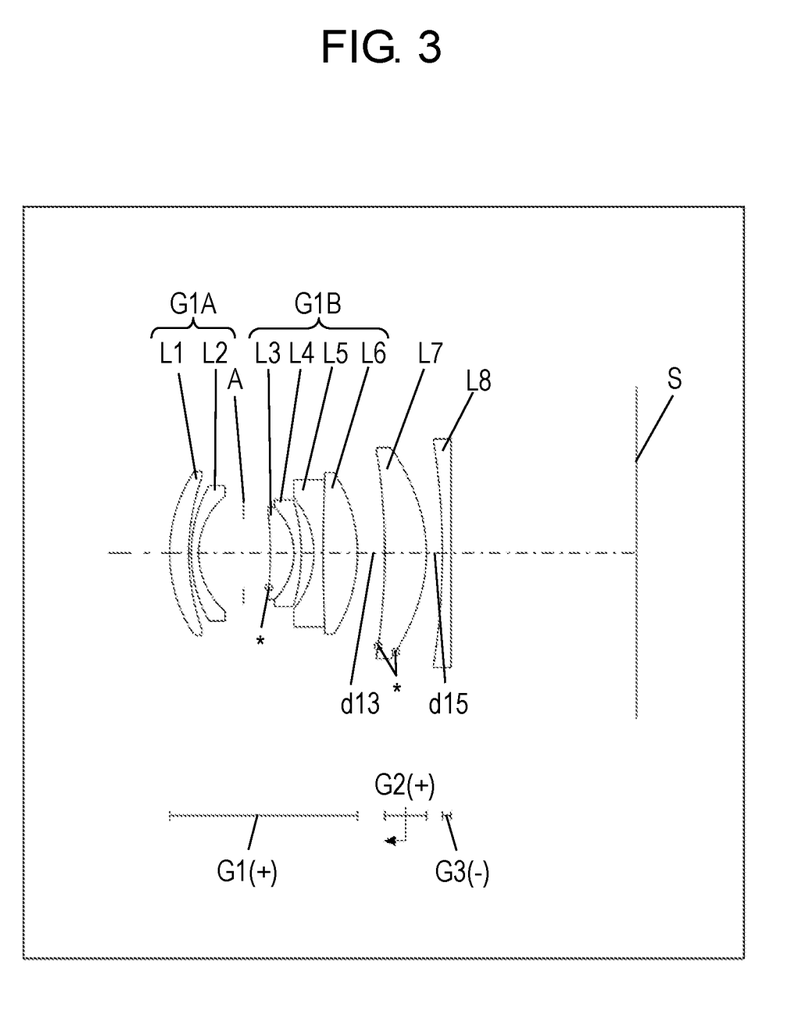
FIG. 3 is a lens arrangement diagram illustrating an infinity focusing state of a fixed focal length imaging optical system according to a second exemplary embodiment.
Figure 5:
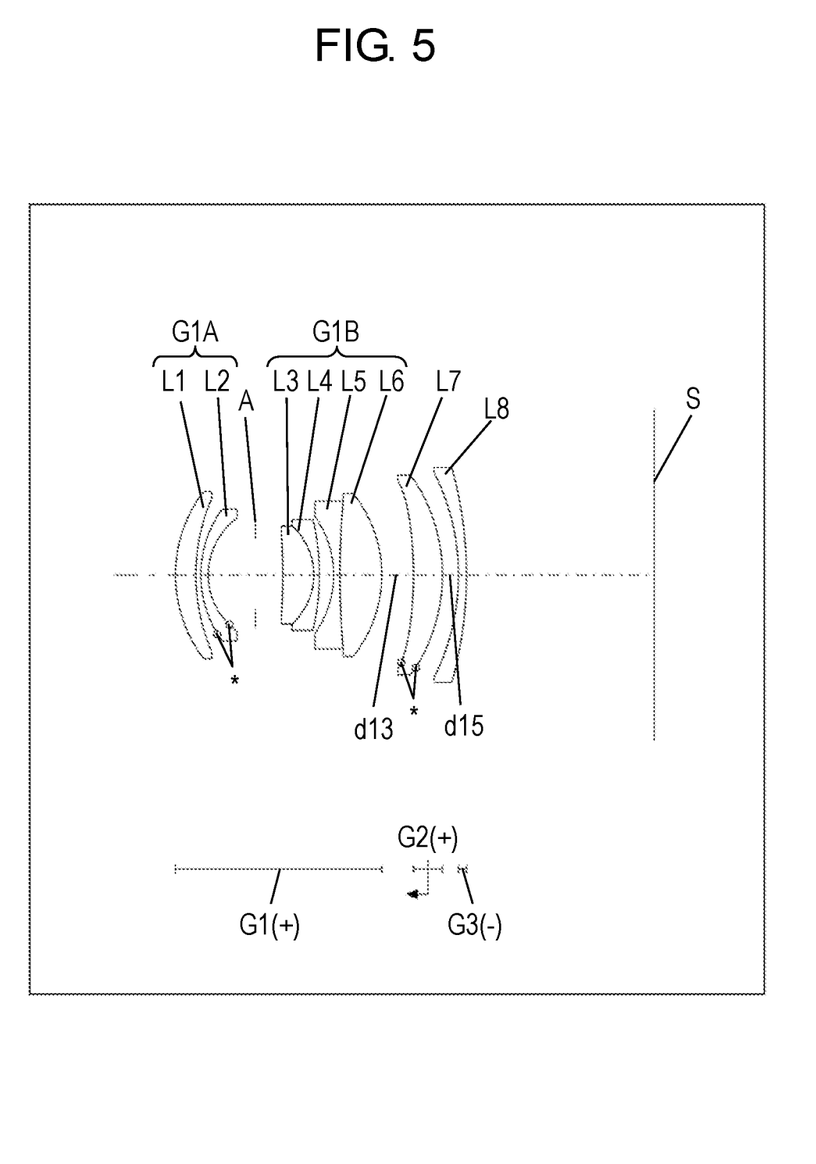
FIG. 5 is a lens arrangement diagram illustrating an infinity focusing state of a fixed focal length imaging optical system according to a third exemplary embodiment.

FIGS. 1, 3, and 5 are lens arrangement diagrams of fixed focal length imaging optical systems according to a first exemplary embodiment to a third exemplary embodiment, respectively. Note that each of FIGS. 1, 3, and 5 illustrates the fixed focal length imaging optical system in an infinity focusing state.

Furthermore, an arrow attached to a lens group in each of FIGS. 1, 3, and 5 indicates focusing from the infinity focusing state to a proximity focusing state. Note that, in each of FIGS. 1, 3, and 5, a reference sign of each lens group is denoted below a position of each lens group, and therefore the arrow indicating focusing is attached to a lower part of the reference sign of each lens group, for convenience.

In each diagram, an asterisk "*" attached to a certain surface shows that the surface is aspherical. Further, in each diagram, symbol (+) or symbol (−) attached to a sign of each lens group corresponds to a sign of power of each lens group. That is, symbol (+) indicates positive power, and symbol (−) indicates negative power. In each of the drawings, a straight line drawn at a rightmost side indicates a position of image surface S (corresponding to a surface at which an imaging element to be described later is disposed and that faces an object). Note that aspect ratios of FIGS. 1, 3, 5, and 7 are the same.

First Exemplary Embodiment

A fixed focal length imaging optical system according to the first exemplary embodiment will be described below with reference to FIG. 1.

FIG. 1 is a lens arrangement diagram illustrating an infinity focusing state of the fixed focal length imaging optical system according to the first exemplary embodiment.

The fixed focal length imaging optical system according to the first exemplary embodiment includes, for example, first lens group G1 having positive power, second lens group G2 having positive power, and third lens group G3 having negative power in order from an object side toward an image side. Note that the object side corresponds to a side of first lens group G1, and the image side corresponds to a side of image surface S.

First lens group G1 includes first A lens group G1A having negative power, aperture diaphragm A, and first B lens group G1B having positive power in order from the object side toward the image side.

First A lens group G1A includes first lens element L1 having positive power and second lens element L2 having negative power in order from the object side toward the image side.

First B lens group G1B includes third lens element L3 having positive power, fourth lens element L4 having negative power, fifth lens element L5 having negative power, and sixth lens element L6 having positive power in order from the object side toward the image side. Third lens element L3 and fourth lens element L4 configure a cemented lens that is bonded using, for example, an adhesive such as an ultraviolet curing resin.

Second lens group G2 is configured with seventh lens element L7 having positive power.

Third lens group G3 is configured with eighth lens element L8 having negative power.

Each lens element will be described below.

First, the lens elements in first A lens group G1A will be described below. First lens element L1 is a meniscus lens having a convex surface on the object side. Second lens element L2 is a meniscus lens having a convex surface on the object side. Both surfaces of second lens element L2 are aspherical.

Next, the lens elements in first B lens group G1B will be described below. Third lens element L3 is a meniscus lens having a convex surface on the image side. Fourth lens element L4 is a meniscus lens having a convex surface on the image side. Fifth lens element L5 is a biconcave lens. Sixth lens element L6 is a biconvex lens.

Next, the lens element in second lens group G2 will be described below. Seventh lens element L7 is a meniscus lens having a convex surface on the image side. Both surfaces of seventh lens element L7 are aspherical.

Next, the lens element in third lens group G3 will be described below. Eighth lens element L8 is a meniscus lens having a convex surface on the image side.

In the fixed focal length imaging optical system according to the present disclosure, upon focusing from the infinity focusing state to the proximity focusing state, first lens group G1 and third lens group G3 do not move, and second lens group G2 moves toward the object along an optical axis. In other words, in the fixed focal length imaging optical system, upon focusing, intervals between first lens group G1, second lens group G2, and third lens group G3 vary.

The fixed focal length imaging optical system according to the present disclosure is configured and operates as described above.

Second Exemplary Embodiment

A fixed focal length imaging optical system according to the second exemplary embodiment will be described below with reference to FIG. 3.

FIG. 3 is a lens arrangement diagram illustrating an infinity focusing state of the fixed focal length imaging optical system according to the second exemplary embodiment.

The fixed focal length imaging optical system according to the second exemplary embodiment includes, for example, first lens group G1 having positive power, second lens group G2 having positive power, and third lens group G3 having negative power in order from an object side toward an image side.

First lens group G1 includes first A lens group G1A having negative power, aperture diaphragm A, and first B lens group G1B having positive power in order from the object side toward the image side.

First A lens group G1A includes first lens element L1 having positive power and second lens element L2 having negative power in order from the object side toward the image side.

First B lens group G1B includes third lens element L3 having positive power, fourth lens element L4 having negative power, fifth lens element L5 having negative power, and sixth lens element L6 having positive power in order from the object side toward the image side. Third lens element L3 and fourth lens element L4 configure a cemented lens that is bonded using, for example, an adhesive such as an ultraviolet curing resin.

Second lens group G2 is configured with seventh lens element L7 having positive power.

Third lens group G3 is configured with eighth lens element L8 having negative power.

Each lens element will be described below.

First, the lens elements in first A lens group G1A will be described below. First lens element L1 is a meniscus lens having a convex surface on the object side. Second lens element L2 is a meniscus lens having a convex surface on the object side.

Next, the lens elements in first B lens group G1B will be described below. Third lens element L3 is a meniscus lens having a convex surface on the image side. The image-side surface of third lens element L3 is aspherical. Fourth lens element L4 is a meniscus lens having a convex surface on the image side. Fifth lens element L5 is a biconcave lens. Sixth lens element L6 is a biconvex lens.

Next, the lens element in second lens group G2 will be described below. Seventh lens element L7 is a meniscus lens having a convex surface on the image side. Both surfaces of seventh lens element L7 are aspherical.

Next, the lens element in third lens group G3 will be described below. Eighth lens element L8 is a biconcave lens.

In the fixed focal length imaging optical system according to the present disclosure, upon focusing from the infinity focusing state to the proximity focusing state, first lens group G1 and third lens group G3 do not move, and second lens group G2 moves toward the object along an optical axis. In other words, in the fixed focal length imaging optical system, upon focusing, intervals between first lens group G1, second lens group G2, and third lens group G3 vary.

The fixed focal length imaging optical system according to the present disclosure is configured and operates as described above.

Third Exemplary Embodiment

A fixed focal length imaging optical system according to the third exemplary embodiment will be described below with reference to FIG. 5.

FIG. 5 is a lens arrangement diagram illustrating an infinity focusing state of the fixed focal length imaging optical system according to the third exemplary embodiment.

The fixed focal length imaging optical system according to the third exemplary embodiment includes, for example, first lens group G1 having positive power, second lens group G2 having positive power, and third lens group G3 having negative power in order from an object side toward an image side.

First lens group G1 includes first A lens group G1A having negative power, aperture diaphragm A, and first B lens group G1B having positive power in order from the object side toward the image side.

First A lens group G1A includes first lens element L1 having positive power and second lens element L2 having negative power in order from the object side toward the image side.

First B lens group G1B includes third lens element L3 having positive power, fourth lens element L4 having negative power, fifth lens element L5 having negative power, and sixth lens element L6 having positive power in order from the object side toward the image side. Third lens element L3 and fourth lens element L4 configure a cemented lens that is bonded using, for example, an adhesive such as an ultraviolet curing resin.

Second lens group G2 is configured with seventh lens element L7 having positive power.

Third lens group G3 is configured with eighth lens element L8 having negative power.

Each lens element will be described below.

First, the lens elements in first A lens group G1A will be described below. First lens element L1 is a meniscus lens having a convex surface on the object side. Second lens element L2 is a meniscus lens having a convex surface on the object side. The object-side surface of second lens element L2 is aspherical.

Next, the lens elements in first B lens group G1B will be described below. Third lens element L3 is a meniscus lens having a convex surface on the image side. The image-side surface of third lens element L3 is aspherical. Fourth lens element L4 is a meniscus lens having a convex surface on the image side. Fifth lens element L5 is a biconcave lens. Sixth lens element L6 is a biconvex lens.

Next, the lens element in second lens group G2 will be described below. Seventh lens element L7 is a meniscus lens having a convex surface on the image side. Both surfaces of seventh lens element L7 are aspherical.

Next, the lens element in third lens group G3 will be described below. Eighth lens element L8 is a biconcave lens.

In the fixed focal length imaging optical system according to the present disclosure, upon focusing from the infinity focusing state to the proximity focusing state, first lens group G1 and third lens group G3 do not move, and second lens group G2 moves toward the object along an optical axis. In other words, in the fixed focal length imaging optical system, upon focusing, intervals between first lens group G1, second lens group G2, and third lens group G3 vary.

The fixed focal length imaging optical system according to the present disclosure is configured and operates as described above.

Conditions and Effects

Conditions that can satisfy the configurations of the fixed focal length imaging optical systems of the first to third exemplary embodiments will be described below.

A plurality of possible conditions are defined to the fixed focal length imaging optical system of each exemplary embodiment. In this case, the configuration of the fixed focal length imaging optical system satisfying all the conditions is most effective.

Alternatively, by satisfying an individual condition as follows, a fixed focal length imaging optical system exhibiting an effect corresponding to this condition can be obtained.

The fixed focal length imaging optical system according to each of the first to third exemplary embodiments includes, for example, first lens group G1 having positive power, second lens group G2 having positive power, and third lens group G3 having negative power in order from the object side toward the image side. In the fixed focal length imaging optical system, upon focusing, second lens group G2 moves along an optical axis, and first lens group G1 and third lens group G3 do not move.

This enables focusing without changing a total length of the fixed focal length imaging optical system.

Desirably the fixed focal length imaging optical system according to the present disclosure satisfies the following conditions (1), (2), and (3).

$$2.3 < TL/Y' < 3.0 \tag{1}$$

$$0.5 < TG/TL < 0.7 \tag{2}$$

$$1.5 < TL/FL < 2.5 \tag{3}$$

Herein, TL is a total optical length (a distance from a lens surface closest to the object to an image surface), TG is a thickness of the optical system (a sum of thicknesses of the lens elements configuring the fixed focal length imaging optical system), Y' is a maximum imaged height of the imaging surface, and FL is a focal length for the infinity.

In other words, the condition (1) defines a relationship between the maximum imaged height of the imaging surface and the total optical length (the distance from the lens surface closest to the object to the image surface).

When TL/Y' is less than or equal to a lower limit value (2.3) in the condition (1), the total optical length becomes excessively short, thereby hindering sufficient aberration correction. In contrast, when TL/Y' is more than or equal to an upper limit value (3.0) in the condition (1), the total optical length becomes long, thereby hindering achievement of downsizing.

In addition, the condition (2) defines a relationship between the total optical length (the distance from the lens surface closest to the object to the image surface) and the thickness of the optical system (the sum of thicknesses of the lens elements configuring the fixed focal length imaging optical system).

When TG/TL is less than or equal to a lower limit value (0.5) in the condition (2), the lens thickness becomes excessively thin, thereby hindering correction of various aberrations, especially coma aberration. In contrast, when TG/TL is more than or equal to an upper limit value (0.7) in the condition (2), a sufficient back focus cannot be ensured. This hinders disposition of optical elements provided for a camera, the optical elements including an infrared (IR) cut filter and a low-pass filter (LPF), in the fixed focal length imaging optical system.

In addition, the condition (3) defines a relationship between the focal length for the infinity and the total optical length (the distance from the lens surface closest to the object to the image surface).

When TL/FL is less than or equal to a lower limit value (1.5) in the condition (3), the total optical length becomes excessively short, thereby hindering sufficient correction of various aberrations, especially coma aberration and image surface curvature. In contrast, when TL/FL is more than or equal to an upper limit value (2.5) in the condition (3), the total optical length becomes excessively long, thereby hindering achievement of downsizing.

At this time, it is more preferable to satisfy any one of the following conditions (1a), (1b), (2a), (2b), (3a), and (3b) within each range of the conditions (1), (2), and (3).

$$2.35<TL/Y' \quad (1a)$$

$$TL/Y'<2.8 \quad (1b)$$

$$0.53<TG/TL \quad (2a)$$

$$TG/TL<0.67 \quad (2b)$$

$$1.7<TL/FL \quad (3a)$$

$$TL/FL<2.3 \quad (3b)$$

Satisfying any one of these conditions further improves the above-described effects.

In addition, it is more preferable to satisfy any one of the following conditions (1c), (1d), (2c), (2d), (3c), and (3d) within each range of the conditions (1), (2), and (3).

$$2.4<TL/Y' \quad (1c)$$

$$TL/Y'<2.75 \quad (1d)$$

$$0.55<TG/TL \quad (2c)$$

$$TG/TL<0.65 \quad (2d)$$

$$1.9<TL/FL \quad (3c)$$

$$TL/FL<2.2 \quad (3d)$$

Satisfying any one of these conditions further improves the above-described effects.

In addition, in the fixed focal length imaging optical system according to the present disclosure, first lens group G1 desirably includes first A lens group G1A having negative power, aperture diaphragm A, and first B lens group G1B having positive power in order from the object side toward the image side.

This configuration allows first lens group G1 to be a retrofocus type configured with first A lens group G1A having negative power and first B lens group G1B having positive power. The fixed focal length imaging optical system is therefore configured to be suitable for a wide-angle lens.

In addition, in the fixed focal length imaging optical system according to the present disclosure, first A lens group G1A desirably includes first lens element L1 having positive power and second lens element L2 having negative power in order from the object side toward the image side.

This allows first lens element L1 to have a convex surface on the object side, while allowing first A lens group G1A to have negative power. Accordingly, a total lens length can be made shorter in the fixed focal length imaging optical system.

Desirably the fixed focal length imaging optical system of the present disclosure satisfies the following condition (4).

$$1.0<(1-\beta 2G^2)\beta 3G^2<1.5 \quad (4)$$

Herein, β2G is lateral magnification of second lens group G2, and β3G is lateral magnification of third lens group G3.

In other words, the condition (4) defines a relationship between the lateral magnification of second lens group G2 and the lateral magnification of third lens group G3.

When $(1-\beta 2G^2)\beta 3G^2$ is less than or equal to a lower limit value (1.0) in the condition (4), a movement amount of the focus lens becomes large. Accordingly, sufficient group intervals are needed for focusing, in the fixed focal length imaging optical system. As a result, a total length of the lens barrel is needed to be long. In contrast, when $(1-\beta 2G^2)\beta 3G^2$ is more than or equal to an upper limit value (1.5) in the condition (4), an image-surface focus movement amount becomes large relative to the movement amount of the focus lens. Accordingly, highly accurate focusing control is needed. With this configuration, even a slight error in focusing control easily produces focusing blur.

At this time, it is more preferable to satisfy any one of the following conditions (4a) and (4b) within a range of the condition (4).

$$1.05<(1-\beta 2G^2)\beta 3G^2 \quad (4a)$$

$$(1-\beta 2G^2)\beta 3G^2<1.4 \quad (4b)$$

Satisfying any one of these conditions further improves the above-described effects.

Further, it is more preferable to satisfy any one of the following conditions (4c) and (4d) within the range of the condition (4).

$$1.1<(1-\beta 2G^2)\beta 3G^2 \quad (4c)$$

$$(1-\beta 2G^2)\beta 3G^2<1.3 \quad (4d)$$

Satisfying any one of these conditions further improves the above-described effects.

In the fixed focal length imaging optical system of the present disclosure, desirably second lens group G2 includes a single lens element having positive power and the following condition (5) is satisfied.

$$1.70<Nd2G<1.85 \quad (5)$$

Herein, Nd2G is a refractive index of second lens group G2 at a d-line.

The condition (5) defines the refractive index of a positive lens element at the d-line, the positive lens element being included in second lens group G2.

When Nd2G is less than or equal to a lower limit value (1.70) of the condition (5), image surface curvature and astigmatism is difficult to correct. In contrast, when Nd2G is more than or equal to an upper limit value (1.85) in the condition (5), a glass material in this case has large chromatic dispersion, thereby hindering correction of chromatic aberration.

At this time, it is more preferable to satisfy any one of the following conditions (5a) and (5b) within a range of the condition (5).

$$1.73 < Nd2G \quad (5a)$$

$$Nd2G < 1.80 \quad (5b)$$

Satisfying any one of these conditions further improves the above-described effects.

Further, it is more preferable to satisfy any one of the following conditions (5c) and (5d) within the range of the condition (5).

$$1.75 < Nd2G \quad (5c)$$

$$Nd2G < 1.78 \quad (5d)$$

Satisfying any one of these conditions further improves the above-described effects.

Schematic Configuration of Imaging Device Applied with First Exemplary Embodiment An imaging device applied with the fixed focal length imaging optical system of the first exemplary embodiment will be described below with reference to FIG. 7. As the imaging device, a digital camera will be exemplified and described.

Figure 7:
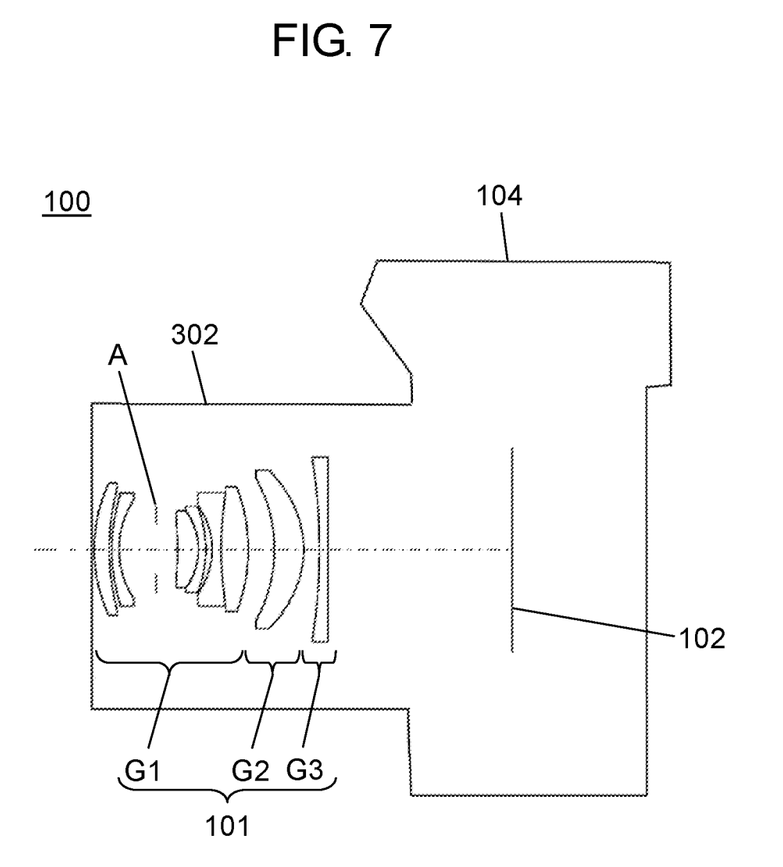
FIG. 7 is a schematic configuration diagram of a digital camera according to the first exemplary embodiment.

FIG. 7 is a schematic configuration diagram illustrating the digital camera applied with the fixed focal length imaging optical system of the first exemplary embodiment.

Note that the imaging device may be applied with the fixed focal length imaging optical system of any one of the second and third exemplary embodiments.

Digital camera 100 exemplifying the imaging device is configured with, for example, housing 104, imaging element 102, fixed focal length imaging optical system 101, and lens barrel 302.

Fixed focal length imaging optical system 101 includes first lens group G1 having positive power, second lens group G2 having positive power, and third lens group G3 having negative power in order from an object side toward an image side. First lens group G1 includes aperture diaphragm A.

Lens barrel 302 holds the lens groups of fixed focal length imaging optical system 101 and aperture diaphragm A.

Imaging element 102 is disposed at a position of image surface S in the fixed focal length imaging optical system according to the first exemplary embodiment as illustrated in FIG. 1.

Furthermore, for example, an actuator and a lens frame included in housing 104 are disposed in fixed focal length imaging optical system 101. The actuator and the lens frame configure second lens group G2 in a movable manner upon focusing.

This configuration can achieve digital camera 100 capable of favorably correcting various aberrations.

In the above description, the fixed focal length imaging optical system according to the first exemplary embodiment is applied to the digital camera by way of example. However, the present disclosure is not limited to this example. For example, the fixed focal length imaging optical system of the present disclosure may be applied to a surveillance camera or a smartphone.

Schematic Configuration of Camera System Applied with First Exemplary Embodiment A camera system applied with the fixed focal length imaging optical system according to the first exemplary embodiment will be described below with reference to FIG. 8.

Figure 8:
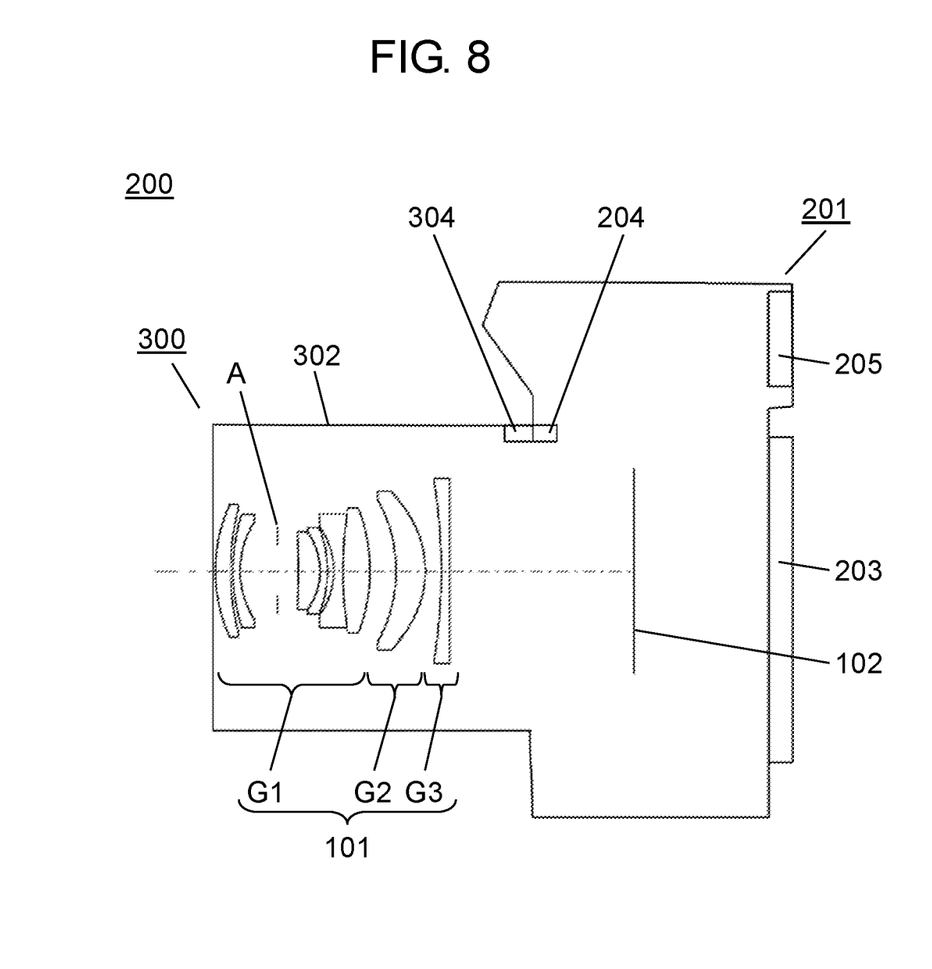
FIG. 8 is a schematic configuration diagram of a lens interchangeable type digital camera system according to the first exemplary embodiment.

FIG. 8 is a schematic configuration diagram illustrating the camera system applied with the fixed focal length imaging optical system according to the first exemplary embodiment.

Note that the camera system may be applied with the fixed focal length imaging optical system of any one of the second and third exemplary embodiments.

Camera system 200 includes, for example, camera body 201 and interchangeable lens device 300 detachably connected to camera body 201.

Camera body 201 includes, for example, imaging element 102, monitor 203, a memory (not illustrated), camera mount 204, and finder 205. Imaging element 102 receives an optical image formed by the fixed focal length imaging optical system in interchangeable lens device 300, and converts the optical image into an electrical image signal. Monitor 203 displays the image signal converted by imaging element 102. The memory stores the image signal.

Interchangeable lens device 300 includes, for example, first lens group G1 having positive power, second lens group G2 having positive power, and third lens group G3 having negative power in order from an object side toward an image side. First lens group G1 includes aperture diaphragm A.

Lens barrel 302 includes the lens groups of fixed focal length imaging optical system 101 and lens mount 304 holding aperture diaphragm A. Lens mount 304 is connected to camera mount 204 of camera body 201.

Camera mount 204 and lens mount 304 are physically connected to each other. Further, camera mount 204 and lens mount 304 cause a controller (not illustrated) in camera body 201 and a controller (not illustrated) in interchangeable lens device 300 to be electrically connected to each other. In other words, camera mount 204 and lens mount 304 function as interfaces enabling mutual transmission and reception of signals.

Fixed focal length imaging optical system 101 is configured with camera body 201 and the lens groups held by lens barrel 302. For example, an actuator and a lens frame to be controlled by the controller in interchangeable lens device 300 are disposed in fixed focal length imaging optical system 101. The actuator and the lens frame configure second lens group G2 in a movable manner upon focusing.

Other Exemplary Embodiments

The technique disclosed in the present application has been described above with the first to third exemplary embodiments as examples.

However, the technique in the present disclosure is not limited to the first to third exemplary embodiments, and can also be applied to exemplary embodiments in which changes, replacements, additions, omissions, and the like are made.

An example in which each lens group in the fixed focal length imaging optical systems according to the first to third exemplary embodiments is configured only with refractive lens elements each of which deflects incident light beams by refraction has been described above. However, the present disclosure is not limited to this example. Note that the refractive lens element means a lens element in which deflection occurs at an interface between media having different refractive indexes from each other.

The lens group may be configured with, for example, a diffraction type lens element that deflects the incident light beams by diffraction, or a refraction-diffraction hybrid type lens element that deflects the incident light beams by combining the refraction and the diffraction. Alternatively, the lens group may be configured with, for example, a refractive index distribution type lens element that deflects the incident light beams through a refractive index distribution in the medium. In particular, in the refraction-diffraction hybrid type lens element, a diffraction structure is preferably formed at the interface between the media having different refractive indexes from each other. This improves wavelength dependence of diffraction efficiency of the refraction-diffraction hybrid type lens element. Those lens elements can achieve the camera system that is excellent in various aberrations.

NUMERICAL EXAMPLES

Numerical examples specifically performed in the configuration of the fixed focal length imaging optical system of any one of the first to third exemplary embodiments will be described below with reference to FIGS. 2, 4, and 6.

Note that in each numerical example, a unit of the length is "mm", and a unit of the view angle is "°" in tables. In each numerical example, r is a radius of curvature, d is an interplanar spacing, nd is a refractive index at the d-line, and vd (also written as vd) is an Abbe number at the d-line. Further, in each numerical example, the surfaces marked with * are aspherical. The aspherical shape is defined by the following mathematical formula.

$$Z = \frac{h^2/r}{1 + \sqrt{1 - (1+\kappa)(h/r)^2}} + \sum A_n h^n \quad \text{[Mathematical Formula 1]}$$

Herein, Z is a distance from a point on the aspherical surface having height h from the optical axis to a tangential plane at a peak of the aspherical surface, h is a height from the optical axis, r is a radius of curvature at the peak, K is a conic constant, and An is an aspherical coefficient of n-th order.

Figure 2:
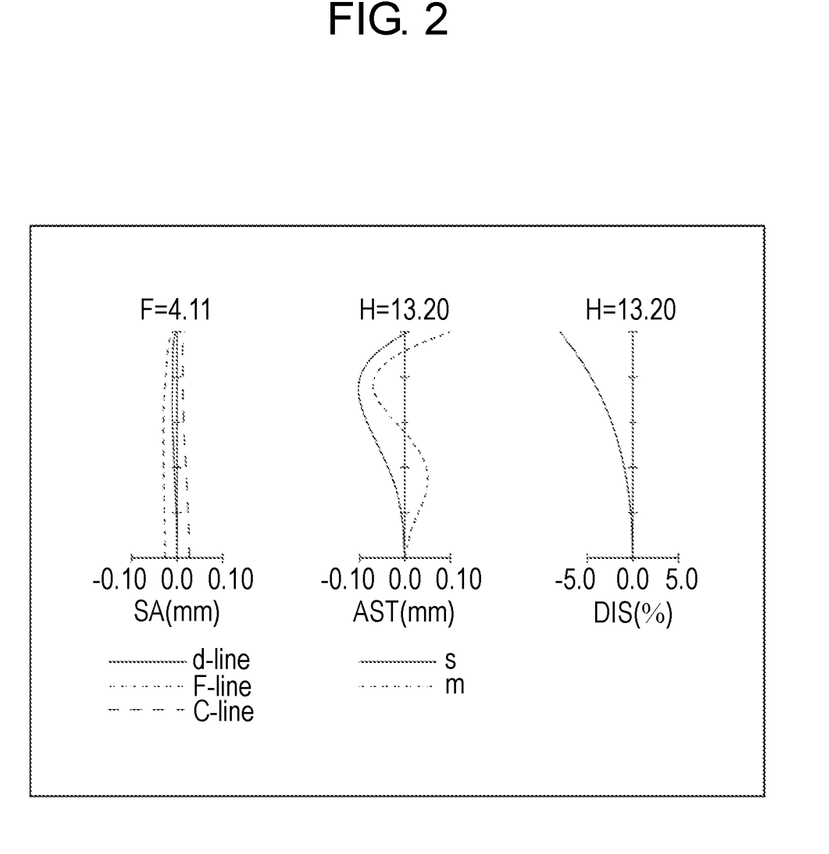
FIG. 2 is a longitudinal aberration diagram of a fixed focal length imaging optical system, in an infinity focusing state, according to a first numerical example of the first exemplary embodiment.
Figure 4:
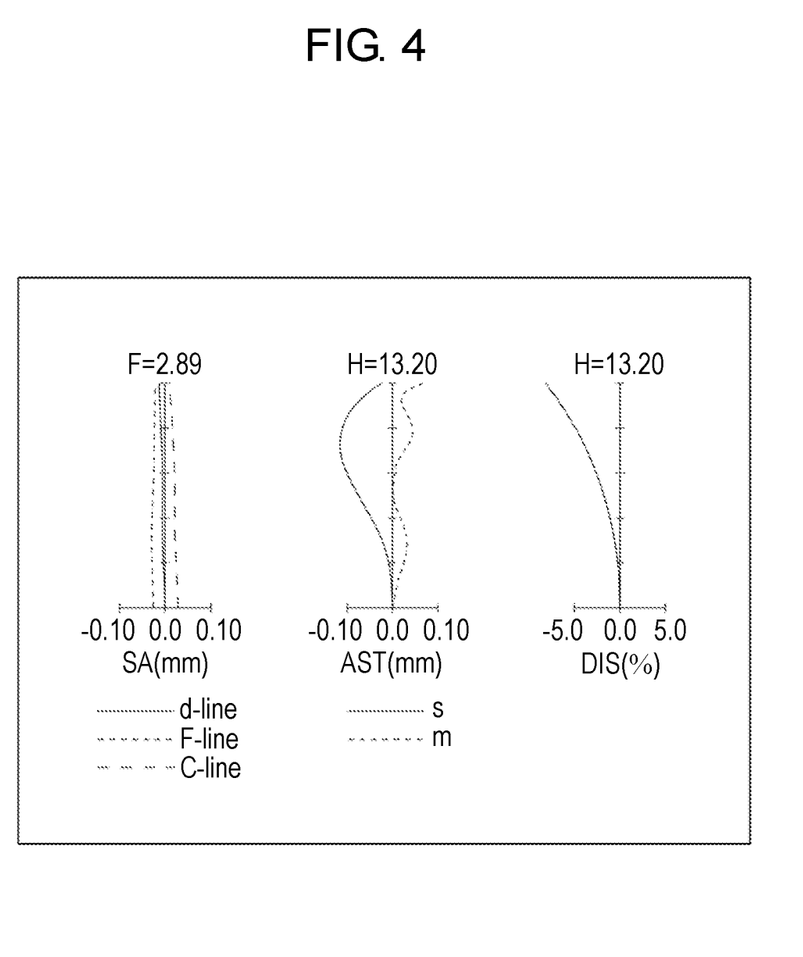
FIG. 4 is a longitudinal aberration diagram of a fixed focal length imaging optical system, in an infinity focusing state, according to a second numerical example of the second exemplary embodiment.
Figure 6:
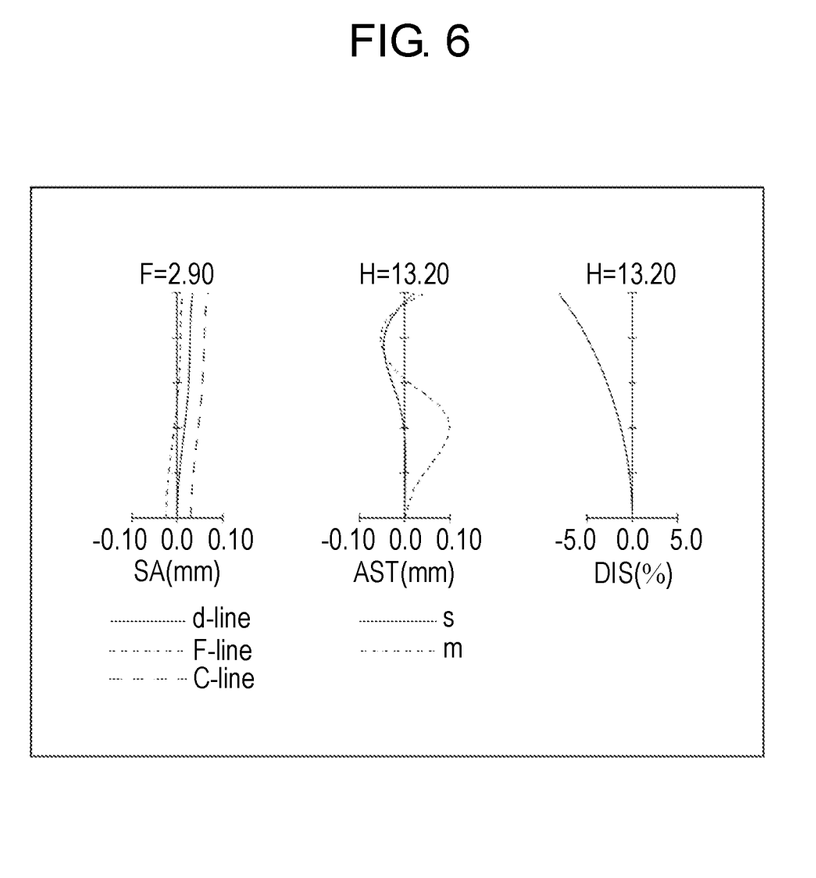
FIG. 6 is a longitudinal aberration diagram of a fixed focal length imaging optical system, in an infinity focusing state, according to a third numerical example of the third exemplary embodiment.

FIGS. 2, 4, and 6 are longitudinal aberration diagrams of fixed focal length imaging optical systems in the infinity focusing state according to the first to third numerical examples corresponding to the first to third exemplary embodiments, respectively.

In each longitudinal aberration diagram, spherical aberration (SA) (mm), astigmatism (AST) (mm), and distortion (DIS) (%) are illustrated in order from the left.

In the view of the SA, a vertical axis indicates an F number (denoted by "F"), a solid line indicates a characteristic for a d-line, a short broken line indicates a characteristic for an F-line, and a long broken line indicates a characteristic for a C-line.

In the view of the AST, a vertical axis indicates an imaged height (denoted by "H"), the solid line indicates a characteristic for a sagittal plane (denoted by "s"), and the broken line indicates a characteristic for a meridional plane (denoted by "m").

In the view of the DIS, a vertical axis indicates an imaged height (denoted by "H").

First Numerical Example

The first numerical example of the fixed focal length imaging optical system corresponding to the first exemplary embodiment in FIG. 1 will be described below. Specifically, as the first numerical example of the fixed focal length imaging optical system, the surface data is indicated in (Table 1), the aspherical data is indicated in (Table 2), and various pieces of data in the infinity focusing state are indicated in (Table 3A to Table 3B).

TABLE 1

(surface data)

| Surface number | r | d | nd | vd |
|---|---|---|---|---|
| Object surface | ∞ | | | |
| 1 | 12.82170 | 1.24620 | 2.00100 | 29.1 |
| 2 | 19.48950 | 0.20000 | | |
| 3* | 14.16440 | 0.60000 | 1.58699 | 59.5 |
| 4 | 7.30140 | 3.06590 | | |
| 5 (Diaphragm) | ∞ | 1.74410 | | |
| 6* | −46.73260 | 1.78530 | 1.77200 | 50.0 |
| 7 | −5.24090 | 0.01000 | 1.56732 | 42.8 |
| 8 | −5.24090 | 0.60000 | 1.75211 | 25.0 |
| 9 | −9.29880 | 0.51810 | | |
| 10 | −6.11690 | 0.75000 | 1.69895 | 30.0 |
| 11 | 29.04080 | 0.01000 | 1.56732 | 42.8 |
| 12 | 29.04080 | 2.21160 | 2.00100 | 29.1 |
| 13 | −14.01940 | 2.15010 | | |
| 14* | −12.62510 | 2.42650 | 1.77200 | 50.0 |
| 15* | −8.02200 | 1.30110 | | |
| 16 | −46.30850 | 0.70000 | 1.80809 | 22.8 |
| 17 | ∞ | BF | | |
| Image surface | ∞ | | | |

TABLE 2

(aspherical data)

Third surface

K = 0.00000E+00, A4 = −6.99573E−05, A6 = 5.01968E−07, A8 = −1.32014E−07
A10 = 2.84445E−09, A12 = 0.00000E+00, A14 = 0.00000E+00

Sixth surface

K = 0.00000E+00, A4 = 1.72235E−04, A6 = −4.97053E−06, A8 = 5.70084E−06
A10 = −2.30020E−06, A12 = 4.66915E−07, A14 = −3.59489E−08

Fourteenth surface

K = 0.00000E+00, A4 = −1.15700E−04, A6 = −6.73709E−07, A8 = 5.53616E−08
A10 = −3.20100E−10, A12 = 0.00000E+00, A14 = 0.00000E+00

TABLE 2-continued (aspherical data)

Fifteenth surface

K = −6.08700E−01, A4 = −2.73845E−05, A6 = −8.65500E−07, A8 = 2.45811E−08
A10 = −2.76025E−11, A12 = 7.17156E−12, A14 = −5.48961E−14

Various Pieces of Data in Infinity Focusing State

TABLE 3A (various pieces of data)

| | |
|---|---|
| Focal length | 18.0157 |
| F number | 4.10720 |
| View angle | 38.5407 |
| Imaged height | 13.2000 |
| Total lens length | 34.5079 |
| BF | 15.18901 |
| Entrance pupil position | 4.8707 |
| Exit pupil position | −18.0488 |
| Front-side principal point position | 13.1215 |
| Rear-side principal point position | 16.4922 |

TABLE 3B (single lens data)

| Lens | Start surface | Focal length |
|---|---|---|
| 1 | 1 | 34.2382 |
| 2 | 3 | −26.5301 |
| 3 | 6 | 7.5056 |
| 4 | 8 | −17.0502 |
| 5 | 10 | −7.1660 |
| 6 | 12 | 9.6946 |
| 7 | 14 | 23.1775 |
| 8 | 16 | −57.3062 |

TABLE 4

(surface data)

| Surface number | r | d | nd | vd |
|---|---|---|---|---|
| Object surface | ∞ | | | |
| 1 | 12.32460 | 1.56120 | 2.00100 | 29.1 |
| 2 | 18.80530 | 0.20000 | | |
| 3 | 11.37350 | 0.60000 | 1.51823 | 59.0 |
| 4 | 6.29020 | 3.66170 | | |
| 5 (Diaphragm) | ∞ | 2.19210 | | |
| 6* | −30.50330 | 1.91020 | 1.77250 | 49.5 |
| 7 | −5.36360 | 0.01000 | 1.56732 | 42.8 |
| 8 | −5.36360 | 0.60000 | 1.75211 | 25.0 |
| 9 | −14.78670 | 1.02930 | | |
| 10 | −7.21210 | 0.75000 | 1.69895 | 30.0 |
| 11 | 142.57870 | 0.01000 | 1.56732 | 42.8 |
| 12 | 142.57870 | 2.79300 | 2.00100 | 29.1 |
| 13 | −12.55910 | 2.21150 | | |
| 14* | −56.19540 | 3.37110 | 1.77250 | 49.5 |
| 15* | −12.65650 | 1.30000 | | |
| 16 | −58.97190 | 0.70000 | 1.80809 | 22.8 |
| 17 | ∞ | BF | | |
| Image surface | ∞ | | | |

TABLE 5

(aspherical data)

Sixth surface

K = 0.00000E+00, A4 = 5.34374E−05, A6 = −9.46644E−06, A8 = 3.37504E−06
A10 = −5.37095E−07, A12 = 4.39385E−08, A14 = −1.44592E−09

Fourteenth surface

K = 0.00000E+00, A4 = 1.96784E−06, A6 = −3.08457E−07, A8 = 1.45813E−08
A10 = −1.91592E−10, A12 = 0.00000E+00, A14 = 0.00000E+00

Fifteenth surface

K = −9.98321E−01, A4 = 2.46609E−05, A6 = −5.39172E−07, A8 = 2.00280E−08
A10 = −2.81286E−10, A12 = 2.19599E−12, A14 = −1.52395E−14

Second Numerical Example

The second numerical example of the fixed focal length imaging optical system corresponding to the second exemplary embodiment in FIG. 4 will be described below. Specifically, as the second numerical example of the fixed focal length imaging optical system, the surface data is indicated in (Table 4), the aspherical data is indicated in (Table 5), and various pieces of data in the infinity focusing state are indicated in (Table 6A to Table 6B).

Various Pieces of Data in Infinity Focusing State

TABLE 6A (various pieces of data)

| | |
|---|---|
| Focal length | 18.0140 |
| F number | 2.88966 |

TABLE 6A-continued (various pieces of data)

| | |
|---|---|
| View angle | 38.5846 |
| Imaged height | 13.2000 |
| Total lens length | 38.0027 |
| BF | 15.10256 |
| Entrance pupil position | 6.0333 |
| Exit pupil position | -28.5180 |
| Front-side principal point position | 16.6081 |
| Rear-side principal point position | 19.9886 |

TABLE 6B (single lens data)

| Lens | Start surface | Focal length |
|---|---|---|
| 1 | 1 | 31.8845 |
| 2 | 3 | -28.2976 |
| 3 | 6 | 8.1544 |
| 4 | 8 | -11.5050 |
| 5 | 10 | -9.8015 |
| 6 | 12 | 11.6356 |

TABLE 6B-continued (single lens data)

| Lens | Start surface | Focal length |
|---|---|---|
| 7 | 14 | 20.4562 |
| 8 | 16 | -72.9770 |

Third Numerical Example

The third numerical example of the fixed focal length imaging optical system corresponding to the second exemplary embodiment in FIG. 6 will be described below. Specifically, as the third numerical example of the fixed focal length imaging optical system, the surface data is indicated in (Table 7), the aspherical data is indicated in (Table 8), and various pieces of data in the infinity focusing state are indicated in (Table 9A to Table 9B).

TABLE 7

(surface data)

| Surface number | r | d | nd | vd |
|---|---|---|---|---|
| Object surface | ∞ | | | |
| 1 | 11.50480 | 1.65870 | 2.00100 | 29.1 |
| 2 | 16.06050 | 0.40000 | | |
| 3* | 9.11350 | 0.60000 | 1.69384 | 53.1 |
| 4* | 5.71770 | 3.85300 | | |
| 5 (Diaphragm) | ∞ | 2.20750 | | |
| 6 | -58.80920 | 2.52780 | 1.83481 | 42.7 |
| 7 | -5.47060 | 0.00500 | 1.56732 | 42.8 |
| 8 | -5.47060 | 0.45000 | 1.84666 | 23.8 |
| 9 | -20.14240 | 1.16300 | | |
| 10 | -8.31450 | 0.50000 | 1.69895 | 30.0 |
| 11 | 69.18830 | 0.00500 | 1.56732 | 42.8 |
| 12 | 69.18830 | 3.40760 | 2.00100 | 29.1 |
| 13 | -10.78810 | 2.61300 | | |
| 14* | -33.95210 | 2.35910 | 1.77200 | 50.0 |
| 15* | -14.07390 | 1.30000 | | |
| 16 | -18.99640 | 0.65000 | 1.80809 | 22.8 |
| 17 | -33.40560 | BF | | |
| Image surface | ∞ | | | |

TABLE 8

(aspherical data)

Third surface

K = 0.00000E+00, A4 = -1.61457E-04, A6 = 7.00707E-06, A8 = -1.73998E-07
A10 = 1.71888E-09, A12 = 0.00000E+00, A14 = 0.00000E+00

Fourth surface

K = -5.31488E-01, A4 = 1.83770E-04, A6 = 9.56358E-06, A8 = 2.36100E-07
A10 = 4.57222E-09, A12 = 0.00000E+00, A14 = 0.00000E+00

Fourteenth surface

K = 0.00000E+00, A4 = -3.34972E-05, A6 = -1.35259E-06, A8 = 4.18710E-08
A10 = -6.42356E-10, A12 = 0.00000E+00, A14 = 0.00000E+00

Fifteenth surface

K = -2.04613E+00, A4 = -5.18764E-05, A6 = -2.72762E-07, A8 = -7.09851E-09
A10 = 6.26453E-10, A12 = -1.31377E-11, A14 = 5.97116E-14

Various Pieces of Data in Infinity Focusing State

TABLE 9A (various pieces of data)

| | |
|---|---|
| Focal length | 18.4556 |
| F number | 2.90444 |
| View angle | 37.9021 |
| Imaged height | 13.2000 |
| Total lens length | 38.9660 |
| BF | 15.26634 |
| Entrance pupil position | 6.5973 |
| Exit pupil position | -25.4382 |
| Front-side principal point position | 16.6850 |
| Rear-side principal point position | 20.5104 |

TABLE 9B (single lens data)

| Lens | Start surface | Focal length |
|---|---|---|
| 1 | 1 | 34.2752 |
| 2 | 3 | −23.8414 |
| 3 | 6 | 7.0727 |
| 4 | 8 | −8.9971 |
| 5 | 10 | −10.5914 |
| 6 | 12 | 9.5266 |
| 7 | 14 | 29.6070 |
| 8 | 16 | −55.6207 |

Values Corresponding to Conditions

As described above, the fixed focal length imaging optical system of any one of the first to third exemplary embodiments was specifically implemented in the first to third numerical examples, respectively.

(Table 1) below illustrates values corresponding to the above conditions (1) to (5) in each numerical example.

TABLE 1

| | | First numerical example | Second numerical example | Third numerical example |
|---|---|---|---|---|
| Condition (1) | TL/Y' | 2.43 | 2.68 | 2.74 |
| Condition (2) | TG/TL | 0.56 | 0.60 | 0.61 |
| Condition (3) | TL/FL | 1.92 | 2.11 | 2.11 |
| Condition (4) | $(1 - \beta 2G^2)\beta 3G^3$ | 1.22 | 1.30 | 1.10 |
| Condition (5) | Nd2G | 1.7725 | 1.7725 | 1.7725 |

As illustrated in (Table 1), it is shown that the fixed focal length imaging optical system implemented in each numerical example satisfies the above conditions (1) to (5).

As described above, a fixed focal length imaging optical system that is excellent in various aberrations, and an imaging device and a camera system each of which includes the fixed focal length imaging optical system can be provided.

INDUSTRIAL APPLICABILITY

A fixed focal length imaging optical system according to the present disclosure can be applied to a digital still camera, an interchangeable lens system digital camera, a digital video camera, a camera of a cellular phone, a camera of a personal digital assistance (PDA), a camera of a smartphone, a surveillance camera of a surveillance system, a Web camera, and an in-vehicle camera, for example. In particular, the present disclosure is suitable for a fixed focal length imaging optical system, such as a digital still camera system and a digital video camera system, in which high image quality is required.

REFERENCE MARKS IN THE DRAWINGS

G1: first lens group
G1A: first A lens group
G1B: first B lens group
G2: second lens group
G3: third lens group
L1: first lens element
L2: second lens element
L3: third lens element
L4: fourth lens element
L5: fifth lens element
L6: sixth lens element
L7: seventh lens element
L8: eighth lens element
A: aperture diaphragm
S: image surface
100: digital camera (imaging device)
101: fixed focal length imaging optical system
102: imaging element
104: housing
200: camera system
201: camera body
203: monitor
204: camera mount
205: finder
300: interchangeable lens device
302: lens barrel
304: lens mount

The invention claimed is:

1. A fixed focal length imaging optical system consisting of, in order from an object side toward an image side:
a first lens group having positive power;
a second lens group having positive power; and
a third lens group having negative power, wherein
the first lens group consists of, in order from the object side toward the image side,
a first A lens group having negative power,
aperture diaphragm A, and
a first B lens group having positive power,
the first A lens group consists of, in order from the object side toward the image side,
a first lens element having positive power, and
a second lens element having negative power,
the second lens group includes a single lens element having positive power, and
upon focusing, the second lens group moves along an optical axis, and the first lens group and the third lens group do not move.

2. The fixed focal length imaging optical system according to claim 1, wherein conditions (1), (2), and (3) shown below are satisfied, $$2.3 < TL/Y' < 3.0 \quad (1)$$

$$0.5 < TG/TL < 0.7 \quad (2)$$

$$1.5 < TL/FL < 2.5 \quad (3)$$

where,
TL is a total optical length (a distance from a lens surface closest to an object to an image surface),
TG is a thickness of an optical system (a distance from the lens surface closest to the object to a lens surface closest to the image surface),
Y' is a maximum imaged height of an image surface, and
FL is a focal length for infinity.

3. The fixed focal length imaging optical system according to claim 1, wherein a condition (4) shown below is satisfied, $$1.0 < (1-\beta 2G^2)\beta 3G^2 < 1.5 \quad (4)$$

where,
β2G is lateral magnification of the second lens group, and
β3G is lateral magnification of the third lens group.

4. The fixed focal length imaging optical system according to claim 1, wherein the second lens group consists of a single lens element having positive power, and
a condition (5) shown below is satisfied, $$1.70 < Nd2G < 1.85 \tag{5}$$

where,
Nd2G is a refractive index of the second lens group at a d-line.

5. A camera system comprising:
an interchangeable lens device including the fixed focal length imaging optical system according to claim 1; and
a camera body that is detachably connected to the interchangeable lens device with a camera mount, the camera body including an imaging element that receives an optical image formed through the fixed focal length imaging optical system and converts the optical image into an electrical image signal, wherein
the interchangeable lens device forms the optical image of an object on the imaging element.

6. An imaging device that converts an optical image of an object into an electrical image signal and performs at least one of display and storage of the electrical image signal converted, the imaging device comprising:
the fixed focal length imaging optical system according to claim 1 that forms the optical image of the object; and
an imaging element that converts the optical image formed through the fixed focal length imaging optical system into the electrical image signal.

7. A fixed focal length imaging optical system consisting of, in order from an object side toward an image side:
a first lens group having positive power;
a second lens group having positive power; and
a third lens group having negative power, wherein
the second lens group includes a single lens element having positive power, and
upon focusing, the second lens group moves along an optical axis, and the first lens group and the third lens group do not move, and
conditions (1), (2), and (3) shown below are satisfied, $$2.3 < TL/Y' < 3.0 \tag{1}$$

$$0.5 < TG/TL < 0.7 \tag{2}$$

$$1.5 < TL/FL < 2.5 \tag{3}$$

where,
TL is a total optical length (a distance from a lens surface closest to an object to an image surface),
TG is a thickness of an optical system (a distance from the lens surface closest to the object to a lens surface closest to the image surface),
Y' is a maximum imaged height of an image surface, and
FL is a focal length for infinity.

8. The fixed focal length imaging optical system according to claim 7, wherein a condition (4) shown below is satisfied, $$1.0 < (1-\beta 2G^2)\beta 3G^2 < 1.5 \tag{4}$$

where,
β2G is lateral magnification of the second lens group, and
β3G is lateral magnification of the third lens group.

9. The fixed focal length imaging optical system according to claim 7, wherein the second lens group consists of a single lens element having positive power, and
a condition (5) shown below is satisfied, $$1.70 < Nd2G < 1.85 \tag{5}$$

where,
Nd2G is a refractive index of the second lens group at a d-line.

10. A camera system comprising:
an interchangeable lens device including the fixed focal length imaging optical system according to claim 7; and
a camera body that is detachably connected to the interchangeable lens device with a camera mount, the camera body including an imaging element that receives an optical image formed through the fixed focal length imaging optical system and converts the optical image into an electrical image signal, wherein
the interchangeable lens device forms the optical image of an object on the imaging element.

11. An imaging device that converts an optical image of an object into an electrical image signal and performs at least one of display and storage of the electrical image signal converted, the imaging device comprising:
the fixed focal length imaging optical system according to claim 7 that forms the optical image of the object; and
an imaging element that converts the optical image formed through the fixed focal length imaging optical system into the electrical image signal.

* * * * *